United States Patent [19]
Phillips

[11] Patent Number: 5,125,085
[45] Date of Patent: Jun. 23, 1992

[54] LEAST RECENTLY USED REPLACEMENT LEVEL GENERATING APPARATUS AND METHOD

[75] Inventor: Forrest M. Phillips, Chelmsford, Mass.

[73] Assignee: Bull HN Information Systems Inc., Billerica, Mass.

[21] Appl. No.: 402,192

[22] Filed: Sep. 1, 1989

[51] Int. Cl.⁵ ............................................. G06F 12/12
[52] U.S. Cl. .................... 395/400; 364/246.3; 364/256.3; 364/DIG. 1; 364/DIG. 2
[58] Field of Search ... 364/200 MS File, 800 MS File

[56] References Cited

U.S. PATENT DOCUMENTS

| | | | |
|---|---|---|---|
| 4,008,460 | 2/1977 | Bryant et al. | 364/200 |
| 4,168,541 | 9/1979 | DeKarske | 364/200 |
| 4,225,955 | 10/1988 | Liu | 364/200 |
| 4,334,289 | 6/1982 | Lange et al. | 364/900 |
| 4,458,316 | 7/1984 | Fry et al. | 364/200 |
| 4,463,420 | 7/1984 | Fletcher | 364/200 |
| 4,467,411 | 8/1984 | Fry et al. | 364/200 |
| 4,731,739 | 3/1988 | Woffinden et al. | 364/200 |
| 4,774,654 | 9/1988 | Pomerene et al. | 364/200 |
| 4,783,235 | 11/1988 | Miu et al. | 364/200 |
| 4,783,735 | 11/1988 | Miu et al. | 364/200 |
| 4,785,398 | 11/1988 | Joyce et al. | 364/200 |
| 4,933,835 | 6/1990 | Sachs et al. | 364/200 |
| 4,967,414 | 10/1990 | Lusch et al. | 364/200 X |
| 4,996,641 | 2/1991 | Talgam et al. | 364/200 |
| 5,060,136 | 10/1991 | Furney et al. | 364/200 X |

Primary Examiner—Glenn Gossage
Assistant Examiner—Michael A. Whitfield
Attorney, Agent, or Firm—Faith F. Driscoll; John S. Solakian

[57] ABSTRACT

A virtual memory management cache memory system has a plurality of directory and buffer store levels for storing page descriptor information. The cache memory directories and a least recently used (LRU) apparatus for replacing information within the buffer store on a least recently used basis are constructed from the same type of standard cache address directory part. Programmable control circuits generate the required input data and control signals which are applied to the LRU apparatus for obtaining signals which indicate a next level to be replaced on a least recently used basis and for updating the contents of the LRU apparatus on a most recently used basis.

26 Claims, 5 Drawing Sheets

LEAST RECENTLY USED REPLACEMENT LEVEL GENERATING APPARATUS AND METHOD

BACKGROUND OF THE INVENTION

1. Field of Use

The present invention relates to apparatus used by a cache memory and more particularly to apparatus for replacing information within the locations of such cache memory.

2. Prior Art

It is well known to interpose a cache memory between a central processing unit and main memory. Such arrangements improve the performance of the processing unit by providing fast access to instructions and data stored in the cache or buffer memory. During normal operation, when the instructions or data requested by the processing unit are not stored in cache, the block containing the requested information is fetched from main memory. When the cache memory is filled, new blocks replace old blocks resident therein.

While different arrangements may be used to select old blocks of information, a least recently used (LRU) replacement has been one of the most commonly used schemes employed in cache units. These units include cache memories and address directory circuits. The memories are organized into a number of levels for storing information in the form of data and instructions for fast access. The directory circuits contain address information for identifying which blocks of instructions and data are stored in the cache memory levels. Generally, the LRU replacement scheme has been implemented using a round robin counter or first in first out (FIFO) array. In such arrangements, the assignment of a group or block of locations is made sequentially. A more accurate record of order of block usage is proved in a system which employs a memory for storing a number of least recently used bits to represent the order of usage of memory locations. This system is disclosed in U.S. Pat. No. 4,334,289.

When implemented as an array, the updating of entries can be time-consuming, particularly when there are a large number of cache level entries. Moreover, the delays in updating, reduce cache system performance and result in least recently used approximation. To overcome these difficulties, apparatus which operates as a shifting content addressable memory (CAM) has been used. This apparatus is disclosed in U.S. Pat. No. 4,783,735. While this apparatus reduces delays and is easily constructed in LSI form, it still does not use standard parts in its construction.

Accordingly, it is a primary object of the present invention to provide high speed apparatus for replacing information within a memory on a least recently used (LRU) basis.

It is a further object of the present invention to provide high performance LRU apparatus implementable with standard integrated circuit parts.

SUMMARY OF THE INVENTION

The above and other objects of the present invention are achieved in a least recently used (LRU) device constructed according to the teachings of the present invention.

In the preferred embodiment, the LRU device is constructed from a cache address comparator IC part which include a static RAM array and a multibit high speed comparator constructed from advanced silicon-gate CMOS technology. The part may take the form of the cache address comparator part designated as 74ACT2152, manufactured by Texas Instruments Incorporated. This same part is normally used only to construct the cache directory circuits.

The advantages in using this same type of commercially available part is that the LRU device can be asynchronously reset to a known state within a single cycle. This is in contrast to having to clear all of the locations within a conventional RAM part which requires a number of cycles. Additionally, the comparator part can be interrogated at any given address and the stored LRU value read out as part of a diagnostic procedure. Also, the LRU device can be quickly updated during a cache cycle in which a hit is detected.

According to the present invention, the LRU device connects in parallel with the cache directory circuits of a set associative cache memory and receives an input address identifying the cache memory location being accessed. The contents of this location are compared with data signals applied to the data inputs of the LRU device in parallel with comparing the same location in the cache directory circuits with the address tag information being applied to the data inputs of the circuits.

In greater detail, a predetermined known set of input data signals which normally correspond to a tag address are applied to the address inputs of the LRU device by programmable control circuits for determining the value stored in the memory location being addressed during an interrogate cycle when the directory circuits do not signal a "hit" condition on any cache memory level. The value from the LRU output is used to identify the level, if any, which was least recently accessed.

In the case of the preferred embodiment which utilizes a two-level set associative cache memory, only a single known address tag value applied to the address inputs during an interrogation cycle by the programmable control circuits is required to establish or identify the least recently used level from the state of the hit or match output signal generated by the comparator at the LRU output. The hit output signal value is converted into a replacement level signal by complementing the LRU output. The replacement level signal is saved, and when the information has been fetched from main memory, it is written into the location of the least recently used level specified by the saved replacement level signal. When the cache directory circuits signal a hit on a level, the programmable control circuits cause the addressed LRU location to be written with the hit output received from a predetermined (i.e., first) level of cache memory while the contents of the cache directory circuits are being interrogated. That is, the contents of the addressed location of the LRU static RAM array is updated with the information indicating the most recently used cache level.

By using a known tag address value and reversing or altering the sequences of cycles performed by the LRU device from those cycles performed by the cache directory circuits as a function of whether or not a "hit" is detected, the standard cache directory address part can be adapted for use as an LRU device.

Additionally, the LRU device of the present invention can be also used to carry out a modify cycle of operation. In this type of operation, it is necessary that certain information be updated and written back into the current level. Thus, when a modify cycle is being performed, the LRU output value generated in response to the "hit," causes a directory level value to be written into the addressed LRU location which is the complement of the level designated by the LRU output value. When the same LRU location is interrogated during the same modify cycle, the LRU output, corresponding to the current level, is stored and used to update a cache location in the current level.

The invention enables the construction of an LRU device which has all of the built in advantages of standard cache address directory parts. Thus, testing and reset operations can be performed more efficiently and effectively. Also, this approach reduces complexity and the amount of space or area required for implementing a cache memory system.

In the preferred embodiment, the LRU requires a small amount of control logic circuits. For example, only a single programmable array logic PAL circuit may be required for providing all of the required LRU control input signals, in addition to the required cache write and data select signals.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
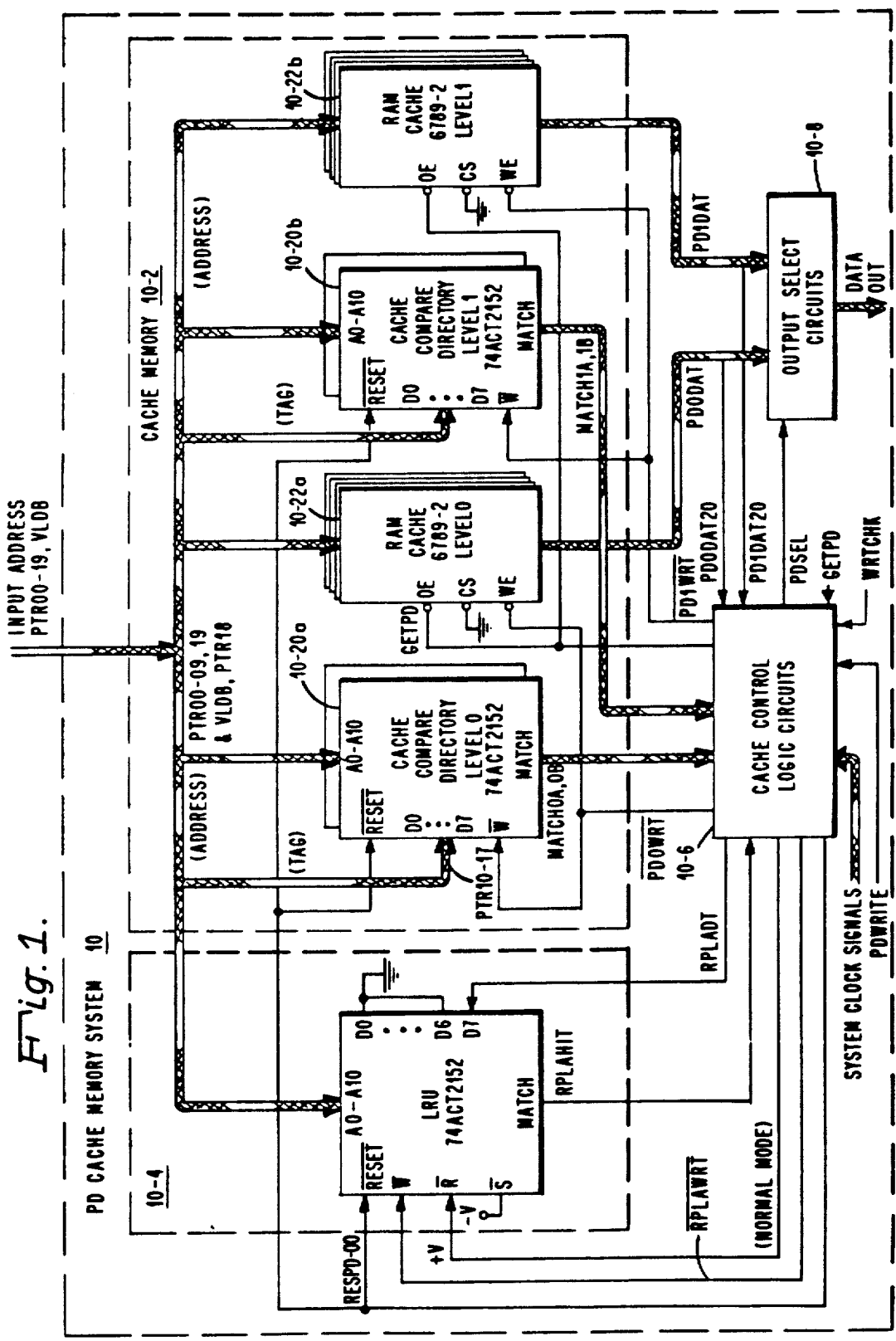
FIG. 1 illustrates in block form, a cache memory system which includes the LRU apparatus of the present invention.
Figure 2A:
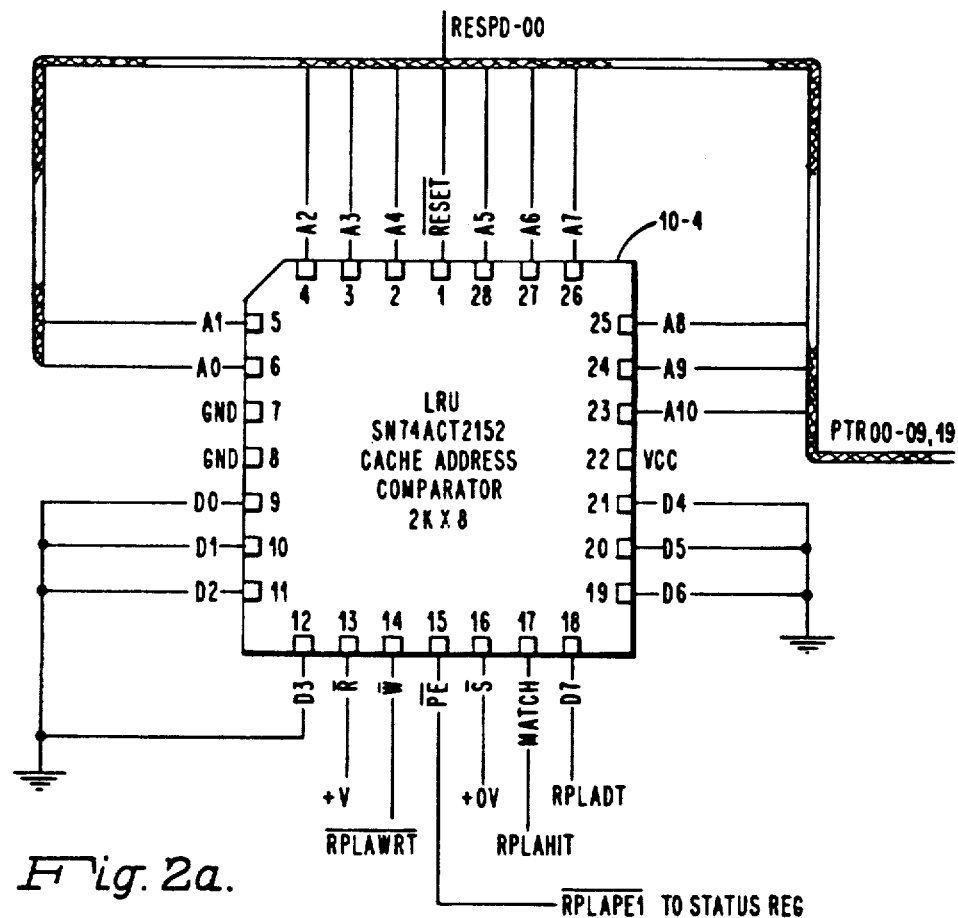
FIGS. 2a and 2b are block diagrams showing in greater detail, different portions of the apparatus of the system of FIG. 1.

As seen from FIG. 1, the cache memory system 10, which includes the replacement level generator LRU 10-4 of the present invention, includes a cache memory 10-2, cache control circuits 10-6, and the data output select of block 10-8. The cache memory 10-2 is a two-level set associative cache memory used for storing page descriptor (PD) addresses for use by a virtual memory management unit (VMU). As shown, it contains two directory sections 10-20a and 10-20b and associated RAM sections 10-22a and 10-22b, arranged as shown. Each of the directory sections are constructed from two standard 2K × 8 cache address comparator chip parts, such as SN74ACT2152, manufactured by Texas Instruments Inc. This part is shown in FIG. 2a in greater detail. The RAM sections 10-22a and 10-22b are constructed from standard static RAM parts, such as 6789-2, manufactured by Hitachi Corporation.

The cache directory sections 10-20a and 10-20b store address information specifying where the page descriptors are stored in their respective RAM sections 10-22a and 10-22b. These circuits, in response to a request for page descriptor data, operate to generate a page hit signal when the requested descriptor information is detected to reside in one of the RAM sections 10-22a and 10-22b. As shown, the hit signals are applied as inputs to the cache control circuits of block 10-6.

The cache control circuits 10-6 generate the required control signals for processing requests. These signals are distributed to different parts of cache memory system 10, including the cache memory 10-2, the output select circuits 10-8, and LRU generator 10-4. As shown, these signals include: a RESET signal RESPD-00 which is active when low and is generated when the cache memory system 10 receives a system reset, diagnostic reset or during cache flushes; an LRU tag signal RPLADT which is generated during an interrogation cycle; a replacement address write signal RPLAWRT for recording the last level accessed for the specified address set; and cache page data level 0 and 1 write signals PD0WRT and PD1WRT for writing data into cache RAMs 10-22a and 10-22b, respectively, and cache PD output data select signals PDSEL for selecting level 0 and level 1 data to be transferred by output circuit 10-8.

REPLACEMENT LEVEL GENERATOR 10-4

As shown in FIG. 1, the LRU generator 10-4, according to the present invention, also utilizes the cache address comparator part 74ACT2152 The LRU generator 10-4 provides via circuits 10-6, the cache memory 10-2 with the level write signal $\overline{PD0WRT}$ or $\overline{PD1WRT}$ of the cache RAM level which was least recently accessed by the input address applied to cache memory system 10. If the applied input address has never been used (i.e., data was not written into the location), then level 0 is assumed to be the least recently used.

The LRU generator 10-4 records which one of the two levels was most recently accessed by any range or set of addresses. When addressed by a particular address set, LRU generator 10-4 generates the output signal RPLAHIT which is used to establish the least recently used level which should be updated for that address set when there is a cache miss indicating that the information specified by the address is not stored in cache memory 10-2.

The signal RPLAHIT is applied as an input to the cache control logic circuits of block 10-6 where it is complemented and then stored for an upcoming write cycle. Circuits of block 10-6 also receive a page descriptor write signal PDWRITE, system clock signals $VT3+00 and $VT1+00 defining the third and first clock phases of a four-phase system cycle of operation, a write check signal WRTCHK, a get page descriptor signal GETPD and modify bit signals PD0DAT20 and PD1DAT20 from cache RAMs 10-22a and 10-22b. The modified bit signals, corresponding to bit 20 within the page descriptors stored in cache memory 10-2, are used for indicating when an update operation is taking place in which case, the LRU generator 10-4 is not required to update the level information for that address. The circuits of block 10-6, shown in greater detail in FIG. 2b, generate the required sequence of control signals in addition to replacement address tag signal RPLADT as previously mentioned.

The LRU generator 10-4, shown in greater detail in FIG. 2a, is constructed from a single 2K × 8 SN74ACT2152 chip part. The part includes a high speed 2K × 9 static RAM array, a parity generator, a parity checker, and a 9-bit high speed comparator circuit. The input and output pins are allocated as shown in FIG. 2a. Briefly, pins 1, 13, 14, and 16 are reset, read, write and select pins, respectively (i.e., $\overline{RESET}$, $\overline{R}$, $\overline{W}$ and $\overline{S}$), each activated by a low (OV) voltage signal. The pins 2 through 6 and 23 through 28 are RAM address input pins, while pins 9-12, 21, 20, 19 and 18 are data input pins. Pin 17 is the match pin, while pin 15 is the parity error pin.

As shown, address signals PTR00-09, 19 are applied to the corresponding pins designated as A0-A10. The data pins designated as D0-D6 are connected to ground, while pin D7 is connected to receive signal RPLADT from control circuits 10-6. The read ($\overline{R}$) pin is connected to receive a positive or +V voltage level which inhibits a read from taking place during normal operation. The select ($\overline{S}$) pin is connected to receive a low or zero volt level which enables the chip for operation. The write ($\overline{W}$) pin is connected to receive write signal RPLAWRT. The match pin generates output signal RPLAHIT, while parity error ($\overline{PE}$) pin generates output signal $\overline{RPLAPE1}$.

LRU generator 10-4 is reset by applying a low active signal to the $\overline{RESET}$ input of the LRU 2152. As mentioned, this is done during system reset, diagnostic reset, and during cache flushes (resets of the entire cache) that occur from time to time during normal system operation.

The LRU generator 10-4 is read when the cache control circuits 10-6 apply an active low signal to the $\overline{READ}$ input while simultaneously applying an active address to the address inputs. This is a very useful function when running diagnostics on the system to assure its correct operation. That is, the cache control circuits 10-6, in response to a diagnostic command, force the read ($\overline{R}$) pin low enabling the read out of the states of the RPLADT bits stored in LRU generator 10-4.

As explained herein, the LRU generator 10-4 is written only during cache cycles which produce cache "hits." This allows the LRU generator 10-4 to record the last level or most recently accessed level for a particular address-set. During the write cycle, the LRU-tag data, including the state of signal RPLADT, is written into the generator's internal RAM. The tag address applied to the data input pins of LRU10-4 corresponds to ZEROS being applied to the first seven inputs and the state of signal RPLADT being applied to the eighth input. The state of signal RPLADT is defined by the state of cache level 0 hit signal PD0HIT. In the absence of hit in level 0, signal PD0HIT is inactive or low.

LRU write cycles occur when the cache directory is not being written (i.e., the directory is being interrogated) when a "hit" occurs in either level of the cache memory. If the "hit" occurs in level 0 of the cache, then the LRU records into the addressed location, a high level or binary ONE RPLADT signal as input data. If the "hit" occurs in level 1 of the cache, then the LRU records into the addressed location, a low or binary ZERO level RPLADT signal as input data.

LRU generator 10-4 performs an interrogate cycle when neither the READ ($\overline{R}$) nor the WRITE ($\overline{W}$) input pins are active, and its Chip Select ($\overline{S}$) input pin is active. In this mode, the generator 10-4 uses the address on its address input pins to read out the contents of its internal RAM. The internal RAM contains a parity bit and any RPLADT values previously stored during previous write cycles. The value read out of its internal RAM is compared to the RPLADT value currently applied to at its data input pins. If a hit occurs, the LRU generator 10-4 forces the MATCH output pin to an active or binary ONE state.

Simultaneously, the parity of the stored data is checked, and any errors in the stored data are reported to the cache control logic circuits 10-6 via forcing the parity error output ($\overline{PE}$) pin to an active state.

LRU interrogate cycles occur only during cache "miss" cycles. That is, LRU generator 10-4 is written during cache "hits," and is interrogated during cache "misses."

CACHE CONTROL LOGIC CIRCUITS 10-6

Figure 2C:
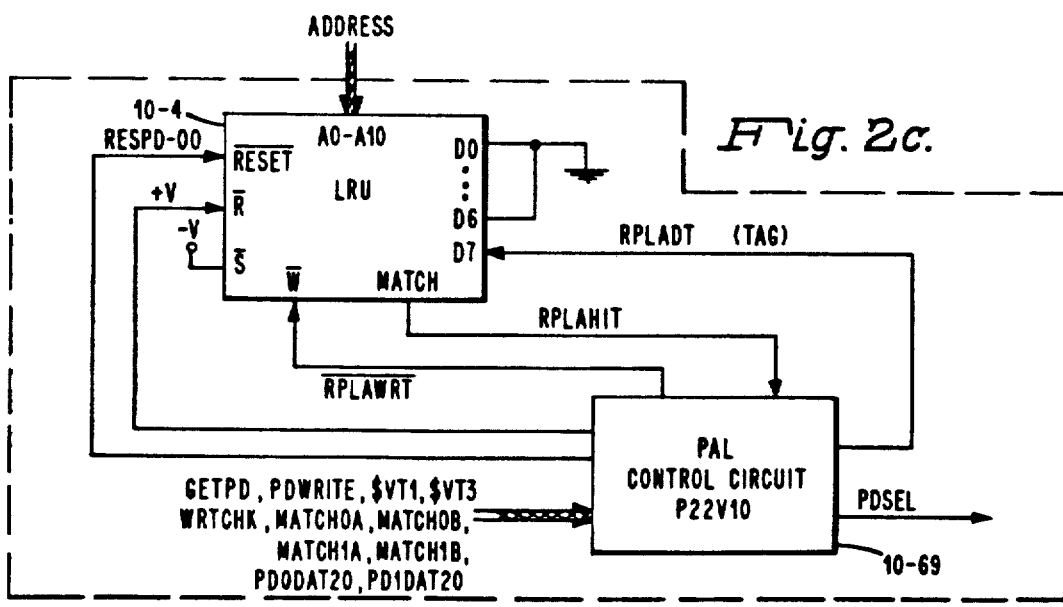
FIG. 2c shows an alternate embodiment of the LRU apparatus of the present invention.
Figure 2B:
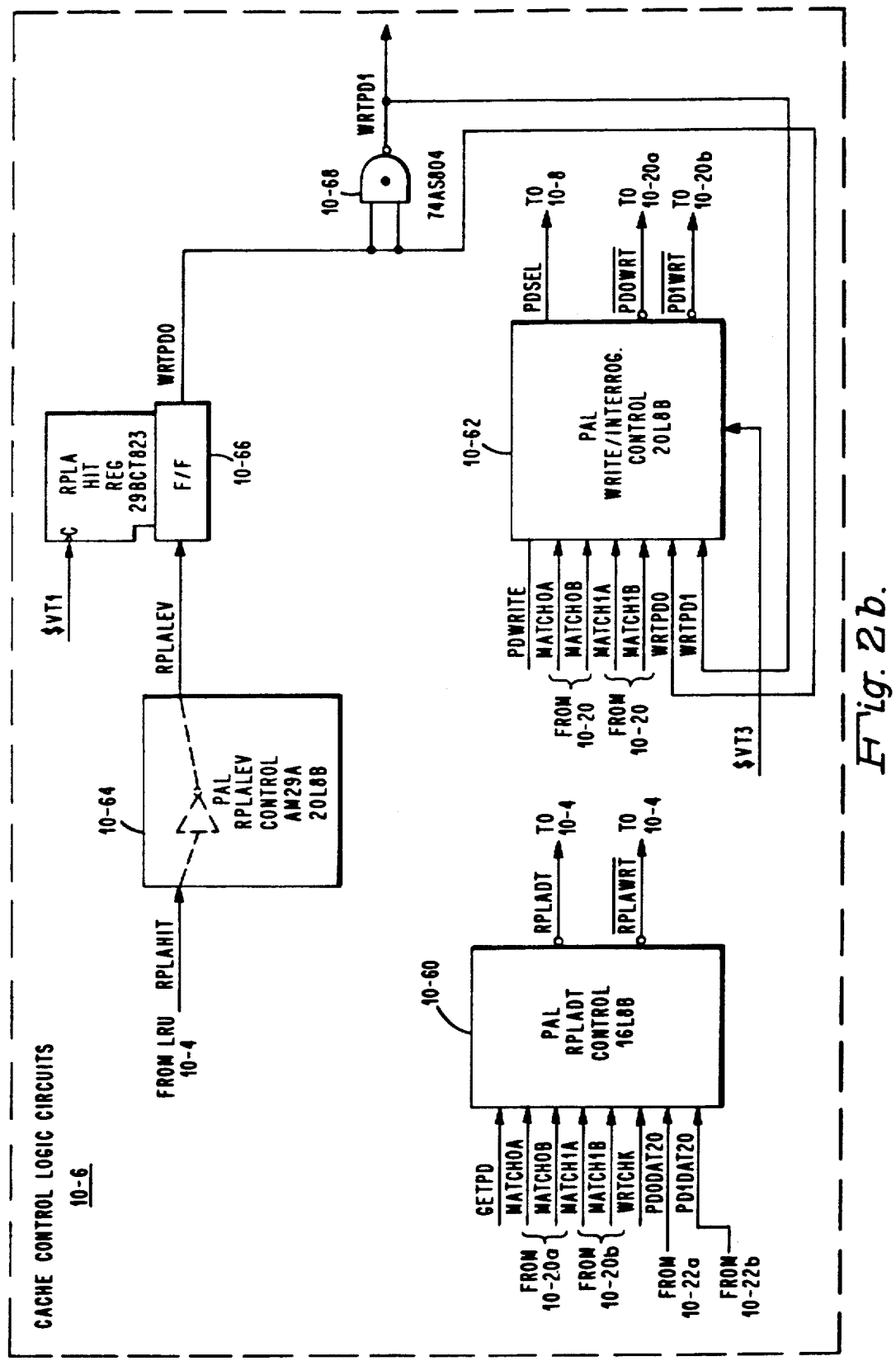

FIG. 2b shows in greater detail, the cache control logic circuits of block 10-6. As shown, the circuits include a plurality of programmable array logic (PAL) circuit elements 10-60, 10-62 and 10-64, a clocked register flip-flop 10-66 and a NAND gate 10-68. The circuits are constructed from standard circuit parts and generate the indicated output signals, according to the Boolean expressions given in an appendix section included herein.

FIG. 2c shows another embodiment of the control logic circuits of block 10-6. The control functions of the PAL circuits 10-60, 62 and 10-64, register 10-66 and inverter circuit 10-68 of FIG. 2b have been programmed and incorporated into a single PAL circuit 10-69, constructed from a standard circuit part which contains register storage.

DESCRIPTION OF OPERATION

With reference to FIGS. 1 through 2b, the operation of the generator 10-6 will now be described in connection with the flow charts of FIGS. 3a and 3b and the diagram of FIG. 3c. As seen from FIG. 3a, the cache control circuits 10-6 force reset signal RESPD-00 to a binary ZERO as part of an initialization or reset sequence.

That is, the signal RESPD-00 is applied to the RESET pin 1 of each of the SN742152 chip parts which make up LRU generator 10-4 and cache address directories 10-20a and 10-20b. This immediately clears the contents of their internal RAMs to ZEROS. Clearing is accomplished by switching the valid bit of all locations to ZEROS.

The 74ACT2152 part is constructed such that it will generate a binary ONE output at the MATCH output pin following a reset operation when binary ZERO data input is applied as an input tag address to any unwritten location. Therefore, the first time each cache location is accessed, a "miss" is signalled, and the LRU generator is interrogated with an all ZERO value. This produces a binary ONE as the "hit" output signal. The requested information is first written into the specified location in cache memory level 1. Therefore, all LRU locations, after being written once, store binary ONES in bit position 7. LRU generator 10-4 is always interrogated with an all ZERO tag address value to determine if cache level 0 produced the last "hit."

When page descriptor data is requested or accessed from PD cache memory system 10, a 20-bit virtual address corresponding to signals PTR00-19 is applied as an input address. As shown in FIG. 1, the input address bits corresponding to the most significant address bit signals PTR00-09, 19 are applied to the address inputs of cache memory directories 10-20a and 10-20b. At the same time, the address tag bits which correspond to the least significant address bit signals PTR10-18 together with validity bit signal VLDB are applied to the data inputs of the directories 10-20a 10-20b. The same input address bit signals are also applied to the address inputs of LRU generator 10-4.

Figures 3A, 3C:
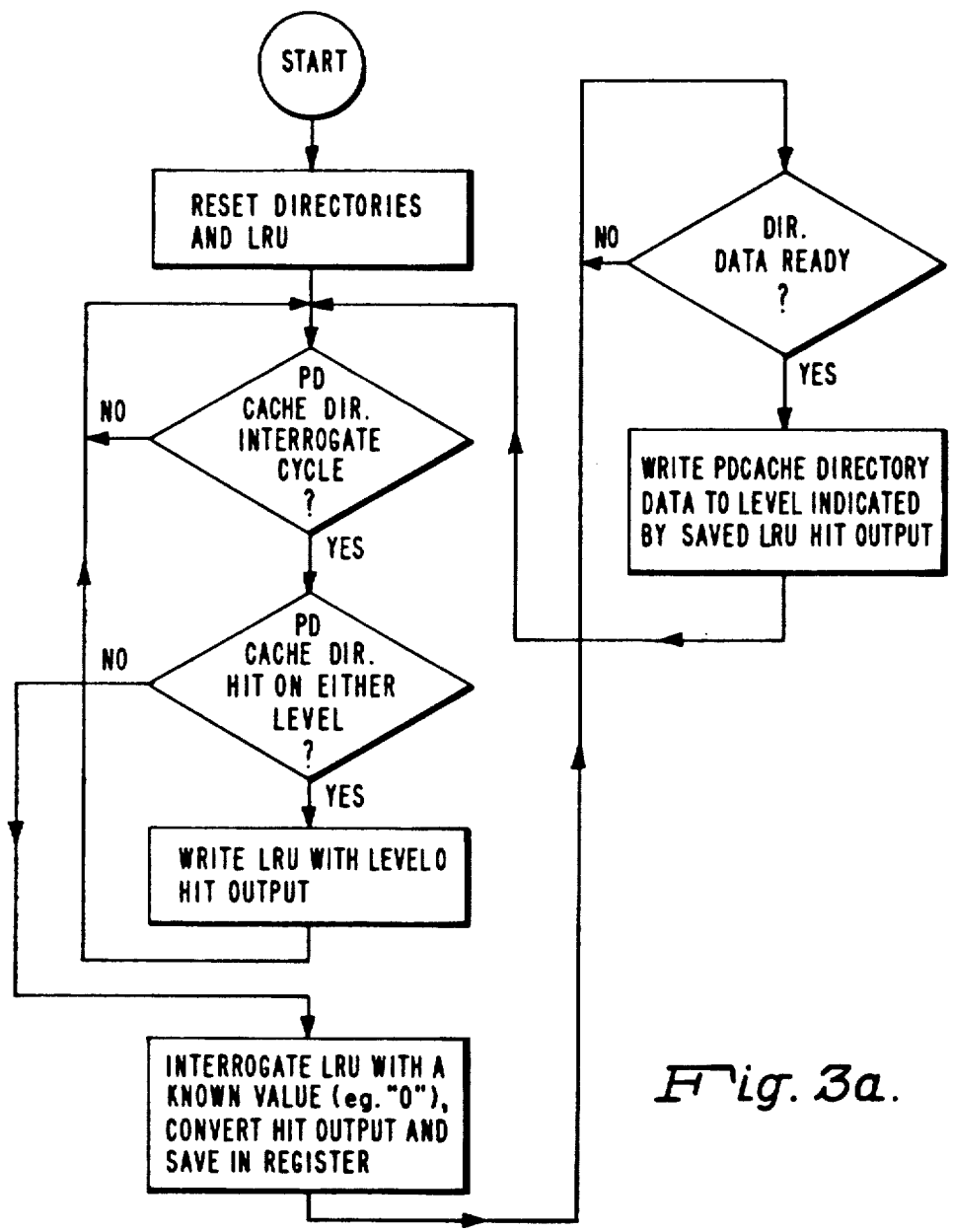
FIGS. 3a through 3c are flow diagrams used in explaining the operation of the LRU apparatus of the present invention.

With reference to FIG. 3a, it is seen that first the directories 10-20a and 10-20b are conditioned to perform an interrogate cycle. At that time, the read and write pins are inactive (i.e., pins R and W are at a high or +V voltage level), while the chip select pin is active (i.e., pin S̄ is low or at 0 voltage level). In this mode, the directories 10-20a and 10-20b, in response to the input address, select a set of two cache locations in their internal RAMs. The tag contents of the set of locations are compared with the tag address bits applied to the directory data inputs.

The tag stored in each location of each of the directories 10-20a and 10-20b contains the most significant bits of the main memory address whose contents are stored there. The main memory address tags are compared for determining whether or not the page descriptor data being requested resides in cache memory 10-2. For the purpose of the present invention, the operation of the directories 10-20a and 10-20b can be assumed to proceed as a typical set-associative cache memory system.

Currently, when the same input address is applied to LRU generator 10-4, a write cycle is performed in the case when a "hit" has been detected in one of the levels of cache memory 10-2 as shown in the cache hit sequence of FIG. 3c. In greater detail, PAL circuit 10-60 of FIG. 2b, in response to one of the sets of match signals from cache directory circuits 10-20a and 10-20b (i.e., MATCH0A,0B or MATCH1A,1B), forces write signal $\overline{\text{RPLAWRT}}$ to a binary ZERO rendering the W input pin active. Signal $\overline{\text{RPLAWRT}}$ is generated according to equation 2 in the Appendix. At that time, the LRU tag data signals, including signal RPLADT, are written into the location in the LRU internal RAM specified by the input address signals.

The signal RPLADT is generated by PAL circuit 10-60 of FIG. 2b. The state of this signal is defined by the set of hit signals MATCH0A,0B received from level 0 directory circuit 10-20a. When the "hit" occurs in cache memory level 0, PAL circuit 10-60 generates signal RPLADT according to equation 1 of the Appendix. In greater detail, signal GETPD is forced to a binary ZERO in the case of a cache "miss." At that time, signal WRTCHK is a binary ZERO, indicating that no modify operation is to be performed. A binary ONE signal is internally generated within PAL circuit, in response to the binary ONE signal HITO. This signal is inverted to a binary ZERO and corresponds to signal RPLADT. The binary ZERO signal is written into the LRU location specified by the input address signals.

This indicates that the most recently used level corresponds to level 0 since the "hit" occurred in level 0. Conversely, if the "hit" was detected in cache memory level 1, signal RPLADT is forced to a binary ONE indicating that the most recently used level corresponds to level 1. This means that the LRU RAM locations are updated with information designating the most recently used level.

As seen from FIG. 3a, when the result of the interrogate cycle performed by cache memory 10-2 results in a cache miss, this causes LRU generator 10-4 to perform an interrogate cycle. That is, when neither the R̄ nor W̄ input pin of LRU generator 10-4 is active, an interrogate cycle takes place. Since the R̄ input pin is normally held at +V volts, signal $\overline{\text{RPLAWRT}}$ is held at a binary ZERO in the absence of a "hit." This results in an interrogate cycle being performed in which the previously stored value of signal RPLADT (i.e., a binary ONE value for cache level 1 hits and a binary ZERO value for cache level 0 hits) is compared with a known value of ZERO. In greater detail, signal GETPD is forced to a binary ONE in response to a cache miss signal. Therefore, PAL circuit 10-60 generates signal RPLADT, according to the equation 1 in the Appendix. That is, it generates a binary ONE signal internally in response to signal GETPD which is inverted to a binary ZERO and corresponds to signal RPLADT. This causes the LRU generator circuit 10-4 to be interrogated with a binary ZERO value.

The result generated from the interrogate cycle being performed by LRU generator 10-4 is reflected in the state of signal RPLAHIT. As mentioned, the state indicates whether or not the last "hit" occurred in cache level 0. In greater detail, when the LRU location specified by the input address contains a binary ZERO in bit position 7, the result of the interrogate cycle is that signal RPLAHIT is forced to a binary ONE. When signal RPLAHIT is a binary ONE, this indicates that the last "hit" occurred in level 0 and that cache level 1 should be replaced. If bit position 7 contained a binary ONE, signal RPLAHIT is forced to a binary ZERO indicating that the last "hit" occurred in level 1 and that cache level 0 should be replaced.

Signal RPLAHIT is applied to PAL circuit 10-64. This circuit generates signal RPLAVEL according to equation 5 in the Appendix. This results in the complement or inversion of signal RPLAHIT (i.e., a binary ZERO) being stored in hit register flip-flop 10-66.

The contents of hit register 10-66 are used during the following cache write cycle. In greater detail, as shown in FIG. 3c, when the requested data has been fetched from main memory as a result of the cache "miss," a write cycle is performed in the directories 10-20a and 10-20b. At that time, signal PDWRITE is forced to a binary ONE.

The level value stored in flip-flop 10-66 causes PAL circuit 10-62 to force one of the write level 0 and 1 signals $\overline{\text{PD0WRT}}$ and $\overline{\text{PD1WRT}}$ to a binary ZERO for writing the descriptor data into the specified cache memory level location. These signals are generated by PAL circuit 10-62 according to the equations 4 and 5 in the Appendix. In greater detail, the binary ZERO signal RPLALEV forces signals WRTPD0 and WRTPD1 to a binary ZERO and a binary ONE, respectively. This causes PAL circuit 10-62 to internally generate signals PD0WRT and PD1WRT according to the stated equations. The resulting signals are inverted by PAL circuit 10-62 to produce signals $\overline{\text{PD0WRT}}$ and $\overline{\text{PD1WRT}}$. This results in signals PD0WRT and PD1WRT being forced to a binary ONE and a binary ZERO, respectively. The binary ZERO signal $\overline{\text{PD1WRT}}$ enables cache level 1 RAM for writing the descriptor data into the specified location. During the time that the write cycle of operation is being performed within the directories 10-20a and 10-20b, the LRU generator 10-4 is performing an interrogate cycle as shown in FIG. 3c.

Figure 3B:
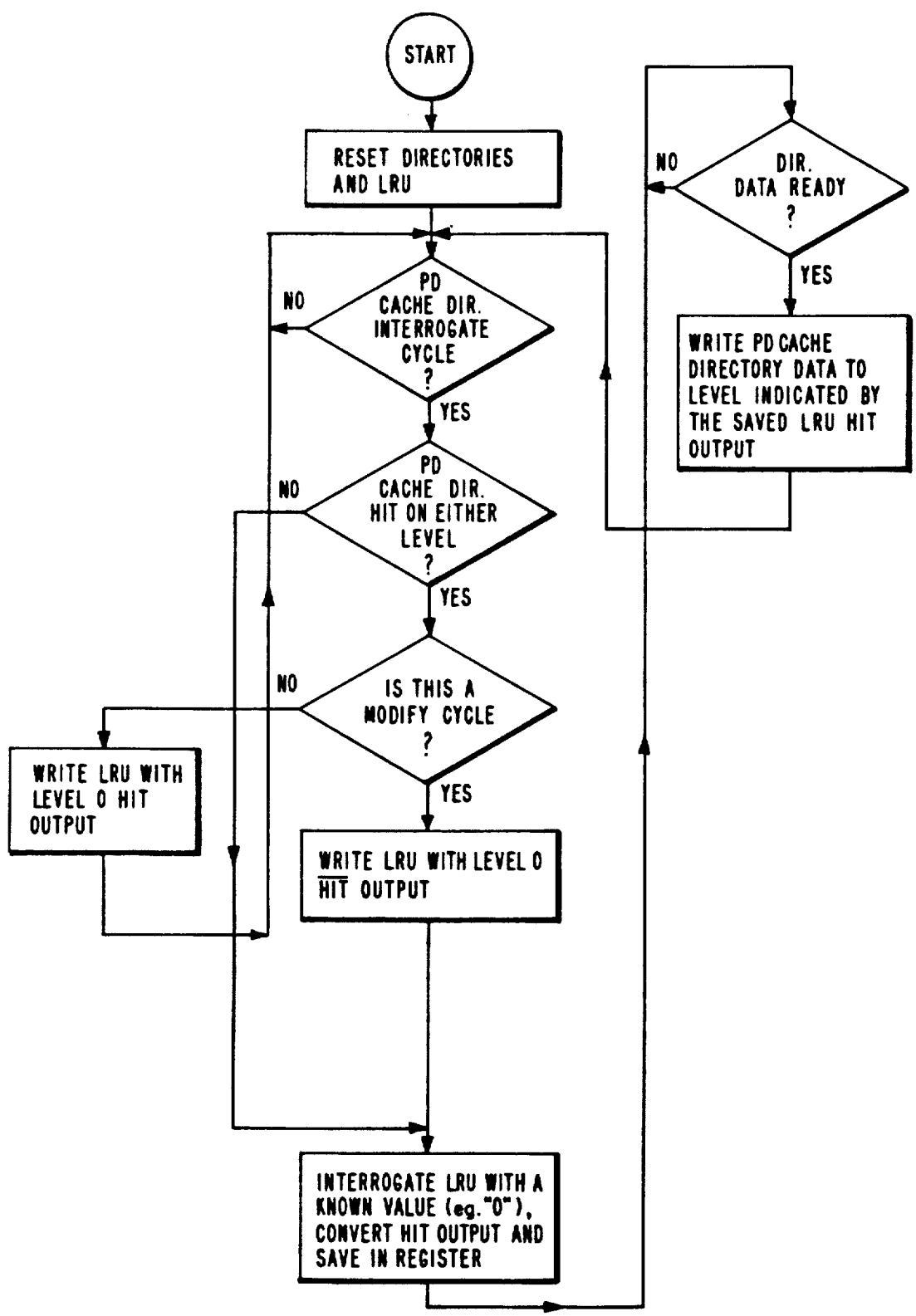

FIG. 3b shows the sequence of operations which take place for a modify type of operation in which the page descriptor stored in cache memory 10-2 location being accessed must be modified. In order to avoid a duplication of descriptor information, the page descriptor data fetched from memory in response to a cache "miss" is written into the same or current cache level.

In greater detail, a cache modify operation is normally performed for indicating that the page defined by a particular page descriptor entry has been altered since it was retrieved from main memory. This is done to ensure use of the latest version of shared memory data. The generation of a write check signal WRTCHK is used to indicate when a modify operation may be required to be performed on a particular page descriptor entry. The state of bit 20 of the page descriptor entry is used to indicate whether or not the page descriptor entry has been modified. When bit 20 is a binary ZERO, this indicates that the modify operation has not been performed on the page descriptor entry. For the purpose of the present invention, the modify operation proceeds in cache memory 10-2 in a conventional manner. For further information regarding this type of operation, reference may be made to U.S. Pat. No. 4,785,398.

The arrangement of the invention accomplishes this by simply modifying the state of the signal corresponding to the level on which the "hit" occurred. This is done by complementing or inverting the state of level 0 hit output signal as indicated in FIG. 3b. The inversion of signal RPLADT is performed by PAL circuit 10-60 according to equation 1 in the Appendix. The signals PD0DAT20 and PD1DAT20 indicate the states of the modified bits in the page descriptors selected in levels 0 and 1 of cache memory 10-2. When a modify cycle is to be performed in a level, the corresponding one of the modified bits is set to a binary ZERO.

Accordingly, when a "hit" occurs on one of the cache levels during a modify cycle of operation, PAL circuit 10-60 generates signal RPLADT by complementing the value designating the level 0 hit which is written into the specified LRU location. Thereafter, as shown in FIG. 3b, the LRU generator 10-4 is interrogated with a binary ZERO data input value and the result is saved in the manner previously described.

As seen from the above, the generator of the present invention provides an accurate and reliable way of generating values for indicating the order of usage of memory locations, such as in a set associative cache memory on a least recently used basis. It has the advantages of being simple and inexpensive to construct from standard, commerically available chips.

Many changes may be made to the preferred embodiment of the present invention. For example, it may be used for caches having a greater number of levels in which case, the number of bits in each LRU location will be increased along with the number of interrogations required. It will be obvious to those skilled in the art that the generator of the present invention may be used with other types of memories or devices. Further, it is not limited to the use of any specific bit locations or number of locations.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

---

APPENDIX

\# = OR
! = negation
& = AND

---

-continued
APPENDIX $ = Clock
1. Replacement array output signal
   RPLADT =
   (LRU/
   INTER-
   ROGATE
   CYCLE)        GETPD
   (LRU
   UPDATE
   CYCLE FOR
   CACHE
   READ OR
   WRITE)        #!GETPD&!WRTCHK&HIT0
   (LRU          #!GETPD&WRTCHK&HIT0&!PD0DAT20
   UPDATE        (Write "0")
   CYCLE         #!GETPD&WRTCHK&HIT1&PD1DAT20
   FOR           (Write "1")
   MODIFY)
   wherein  HIT0 = MATCH0A & MATCH0B,
            HIT1 = MATCH1A & MATCH1B and
            GETPD = 1 when cache miss detected.
2. Replacement array write command signal RPLAWRT
   RPLAWRT =   SVT3 & !GETPD&HIT0
               #SVT3 & !GETPD&HIT1.
3. Directory 0 write control signal PD0WRT
   PD0WRT =    SVT3 & PDWRITE & WRTPD0
   wherein WRTPD0 = REPLALEV and PDWRITE = 1 when
   page descriptor data received from main memory.
4. Directory 1 write control signal PD1WRT
   PD1WRT =    SVT3 & PDWRITE & WRTPD1
   wherein WRTPD1 = !RPLALEV.
5. Replacement array level command signal RPLALEV
   RPLALEV =   !RPLAHIT.
6. Page Descriptor select level signal
   PDSEL =     HIT0 wherein HIT0 = MATCH0A &
               MATCH0B.

What is claimed is:

1. Apparatus for use in a set associative cache memory having a plurality of levels for determining on a least recently used basis, the next level in said cache memory into which information is to be next written or read from, said apparatus comprising:

a cache address comparator circuit including a random access memory (RAM) array having a plurality of locations for storing a corresponding number of level values and a comparator for comparing the contents of one of said plurality of locations defined by an input address applied to a first set of input terminals with a tag address applied to a second set of input terminals for each interrogate cycle, said comparator generating an output signal at an output terminal for indicating a result of said comparing;

input means for applying said tag address to said second set of input terminals; and, programmable control means coupled to said address comparator circuit and to said input means, said programmable control means generating first and second sets of signals as a function of a hit condition and miss condition respectively having been detected by said cache memory, said first set of signals applying a known tag address value to said input means and causing said address comparator circuit to perform an interrogate cycle when said cache memory is performing a write cycle of operation for generating a signal at said output terminal which identifies on a least recently used basis, a next cache level into which information is to be written and said second set of signals applying to said input means, a tag address value indicating the most recently used cache memory accessed level and causing an updating of the level value stored in a location of said array addressed by said input address with said tag address value when said cache memory is being interrogated.

2. The apparatus of claim 1 wherein said programmable control means includes a programmable array logic circuit.

3. The apparatus of claim 1 wherein said input means includes a number of prewired inputs set to an inactive or binary ZERO state and an input connected to said programmable control means for receiving one of said first set of control signals set to an active or binary ONE state during said each interrogate cycle.

4. The apparatus of claim 1 wherein said programmable control means includes conversion means connected to said output terminal of said address comparator circuit, said conversion means converting said output signal into a replacement level signal value generated as a result of performing a predetermined number of interrogate cycles which is coded to specify the least recently used cache level into which information being fetched by said cache memory in response to a miss condition is to be written.

5. The apparatus of claim 4 wherein said cache memory has two levels and wherein said predetermined number of interrogate cycles is one.

6. The apparatus of claim 4 wherein said programmable control means further includes storage means connected to said conversion means, said storage means storing said replacement level signal value to be used during the next cache memory write cycle for writing said information.

7. The apparatus of claim 4 wherein said conversion means includes circuit means for inverting or complementing said output signal to generate said replacment level signal value.

8. The apparatus of claim 4 wherein said programmable control means further includes write control means for generating a plurality of cache memory write signals corresponding in number to the number of cache memory levels in response to said stored replacement level signal value causing said information to be written into said least recently used cache level defined by said replacement level signal value.

9. The apparatus of claim 4 wherein said address comparator circuit further includes a reset input and wherein said programmable control means further includes first circuit means connected to said reset input, said programmable control means in response to an initialize signal applying a signal to said reset input for clearing said plurality of locations to ZEROS within a single cycle of operation.

10. The apparatus of claim 4 wherein said address comparator circuit further includes a read input and wherein said programmable control means further includes second circuit means connected to said read input, said programmable control means in response to a diagnostic mode signal enabling said address comparator circuit for reading out said level values from said plurality of RAM locations for diagnosing faults within said cache memory.

11. The apparatus of claim 1 wherein said programmable control means further includes update circuit means connected to said input means and to said cache memory, said update circuit means in response to a hit output signal from said cache memory indicating that a hit condition was detected in one of said plurality of levels, applying said hit output signal received from a predetermined one of said plurality of levels as said tag address value for updating on a most recently used basis, said level value stored in said addressed location.

12. The apparatus of claim 11 wherein said update circuit means further includes third circuit means, said third circuit means in response to a signal from said cache memory indicating that a modify operation is to be performed within said cache memory, generating said signal by complementing said hit output signal which updates said level value for causing information to be written back into said cache memory back at a current or same level.

13. The apparatus of claim 11 wherein said plurality of levels corresponds to two and wherein said predetermined one of said plurality levels is the first or ZERO level of said cache memory.

14. A method of generating information for replacing information on a least recently used basis within a set associative cache memory containing a plurality of levels, each level implemented using a number of identical standard cache address comparator circuit parts, each part including a static random access memory (RAM) array having a plurality of locations for storing a corresponding number of level values and a comparator for comparing the contents of one of said plurality of locations defined by an input address applied to a first set of input terminals with a tag address applied to a second set of input terminals for generating a signal at an output terminal during each interrogate cycle indicating the result of said comparing, said method comprising the steps of:

(a) applying a reset signal to said each part and to another part which is identical to said each part for initializing all of said plurality of locations of each RAM array to a predetermined state within a single cycle of operation;

(b) connecting said another part for operation as a least recently used (LRU) replacement level generator circuit;

(c) generating a first set of signals during a cache memory interrogate cycle of operation when a hit condition has been detected in one of said plurality of levels of said cache memory by said number of standard cache address comparator circuit parts for applying as said tag address to said first set of input terminals of said another part, a level value corresponding to a most recently used level designated by a hit output signal received from said number of parts of a predetermined one of said plurality of levels and for writing said level value into one of said plurality of locations designated by said input address; and, (d) generating a second set of signals during a cache memory write cycle of operation when a hit condition has not been detected by said number of standard comparator circuit parts in any one of said plurality of levels in said cache memory which apply a known value as said tag address to said first set of input terminals of said another part and interrogate said another part for determining a least recently used level value stored in one of said RAM locations of said another part designated by said input address used for indicating said least recently used level value of said plurality of levels of said cache memory into which information is to be next written.

15. The method of claim 14 wherein step (c) further includes the steps of:
   (1) converting said level value corresponding to the hit output signal produced by said another part in response to being interrogated into a replacement level value; and,
   (2) storing said replacement level value in said another part for subsequent use in writing said information fetched by said set associative cache memory into a least recently used level in said cache memory.

16. The method of claim 14 wherein step (b) further includes the steps of:
   (1) complementing said hit output value received from said number of standard comparator circuit parts corresponding to said predetermined one of said cache levels in response to a signal from said cache memory indicating that a modify operation is required to be performed; and,
   (2) updating said level value in said another part with said hit output value complemented in step (1) for causing said information to be written back into said set associative cache memory at a current or same level.

17. A set associative cache memory system having a plurality of levels, each level including a buffer store having a plurality of locations for storing information for fast access and a directory circuit constructed from a number of standard address comparator parts, each part having a static random access memory (RAM) array containing a plurality of storage locations for storing addresses for designating the locations in said buffer store containing information associated therewith and a comparator, said comparators of said each part generating hit output signals for indicating the presence of a true comparison or match between the address contents of said plurality of locations of said circuit directory specified by an address portion of an input address applied to a first set of input terminals and a tag portion of said input address applied to a second set of input terminals, said cache memory system further including least recently used (LRU) apparatus for generating signals for indicating the next level in said buffer store into which information is to be written, said LRU apparatus comprising:
   another standard part identical to said number of standard address comparator parts, said plurality of locations of said static random access memory (RAM) array circuit of said another standard part storing level values for said plurality of levels and said comparator circuit of said another standard part comparing the contents of one of said plurality of locations defined by said address applied to said first set of input terminals with a tag address value applied to said second set of input terminals, for each interrogate cycle, said comparator circuit generating a hit output signal at an output terminal for indicating the result of said comparing;
   input means for applying said tag address to said second set of input terminals of said another standard part; and,
   programmable control means coupled to said comparator circuit and to said input means, said control means generating first and second sets of signals as a function of a hit output signal and an absence of said hit output signal respectively being generated by said directory circuit of one of said levels generated a hit output signal, said first set of signals applying a known tag address value to said input means and for causing said another standard part to perform an interrogate cycle during which an addressed location specified by said address is accessed when said cache memory directory and buffer stores are performing write cycles of operation, to generate said hit output signal at said output terminal for identifying which one of said buffer stores contains a least recently used cache level into which information is to be written and said second set of signals applying to said input means, a tag address value generated according to said hit output signals received from said number of standard address comparator parts of a predetermined one of said cache levels indicating the most recently used cache level which has been accessed and for updating a stored level value in said addressed location with said tag address value.

18. The LRU apparatus of claim 17 wherein said programmable control means includes a number of programmable array logic circuits.

19. The LRU apparatus of claim 18 wherein said number is one.

20. The LRU apparatus of claim 18 wherein said programmable control means includes conversion means connected to said output terminal of said circuit, said comparator conversion means converting said hit output signal into a replacement level signal value generated as a result of performing a predetermined number of interrogate cycles and which is coded to specify the least recently used cache store level into which information being fetched by said cache memory system in response to a miss condition is to be written.

21. The LRU apparatus of claim 20 wherein said cache memory system has two levels and wherein said predetermined number of interrogate cycles is one.

22. The LRU apparatus of claim 20 wherein said LRU apparatus further includes a hit storage register connected to said conversion means, said storage register storing said replacement level signal value to be used during the next cache memory write cycle for writing said information.

23. The LRU apparatus of claim 20 wherein said conversion means includes an inverter circuit for complementing said output signal to generate said replacement level signal value.

24. The LRU apparatus of claim 20 wherein said programmable control means connects to said directory circuit and further includes write control means for generating in response to said stored replacement level signal value, a plurality of cache memory write signals corresponding in number to the number of cache memory levels for causing said information to be written into said least recently used cache level defined by said replacement level signal value.

25. The LRU apparatus of claim 20 wherein said programmable control means further includes update circuit means connected to said input means and to receive said hit output signals from said cache memory, said update circuit means in response to a hit output signal from said cache memory directory circuits indicating that a hit condition was detected in one of said plurality of levels, applying said hit output signal received from said predetermined one of said levels for updating said stored level in said addressed location.

26. The LRU apparatus of claim 25 wherein said update circuit means includes third circuit means in response to a signal from one of said buffer stores of said cache memory system indicating that a modify operation is to be performed, generating said signal by complementing said hit output signal which updates said level value for causing information to be written back into cache memory back at a current or same level.

* * * * *